United States Patent [19]

Hartmann

[11] Patent Number: 5,536,487
[45] Date of Patent: Jul. 16, 1996

[54] PROCESS FOR THE USE OF RUTILE PROMOTER AND CONTROL ADDITIVES IN THE MANUFACTURE OF TITANIUM DIOXIDE BY THE CHLORIDE PROCESS

[75] Inventor: Achim Hartmann, Pulheim, Germany

[73] Assignee: Kronos, Inc., Hightstown, N.J.

[21] Appl. No.: 395,553

[22] Filed: Feb. 27, 1995

[51] Int. Cl.⁶ .................................................. C01G 23/047
[52] U.S. Cl. .......................................... 423/613; 106/437
[58] Field of Search .............................. 423/613, 614, 423/495; 106/437

[56] References Cited

U.S. PATENT DOCUMENTS

| | | | |
|---|---|---|---|
| 2,559,638 | 7/1951 | Krchma et al. | 106/437 |
| 3,208,866 | 9/1965 | Lewis et al. | 423/613 |
| 3,214,284 | 10/1965 | Wilson | 423/613 |
| 3,329,483 | 7/1967 | Evans et al. | 106/437 |
| 3,434,799 | 3/1969 | Wilson | 423/613 |
| 3,455,653 | 7/1969 | Aftandilian | 106/437 |
| 3,542,521 | 11/1970 | Kulling et al. | 423/495 |
| 3,567,478 | 3/1971 | Dietz et al. | 106/437 |
| 3,640,745 | 2/1972 | Darr et al. | 106/437 |
| 5,196,181 | 3/1993 | Hartmann | 423/613 |
| 5,204,083 | 4/1993 | Magyar et al. | 423/613 |

FOREIGN PATENT DOCUMENTS

| | | | |
|---|---|---|---|
| 689123 | 3/1953 | United Kingdom | 423/613 |
| 876672 | 9/1961 | United Kingdom | 423/613 |
| 2037266 | 7/1980 | United Kingdom | 423/613 |

*Primary Examiner*—Steven Bos
*Attorney, Agent, or Firm*—Michael J. Cronin

[57] ABSTRACT

Small quantities of an alkali metal salt control additive, along with the addition of a rutile promotion additive, preferably aluminum trichloride as ruffle promoter, is added in the oxidation of titanium tetrachloride into the titanium dioxide burner reaction zone. Metal used to make aluminum trichloride is introduced into a aluminum chloride generator reactor in a main branch, and the alkali metal salt is introduced in a subsidiary branch in a controlled addition provided by a "dilution" mixture of the salt in aluminum powder and preferably by applying additional agents which improve the flee-flowing properties of the mixture such as, for example, anhydrous potassium oleate.

13 Claims, 1 Drawing Sheet

5,536,487

1

PROCESS FOR THE USE OF RUTILE PROMOTER AND CONTROL ADDITIVES IN THE MANUFACTURE OF TITANIUM DIOXIDE BY THE CHLORIDE PROCESS

FIELD OF THE INVENTION

The process of the present invention relates to an improved process for the manufacture of titanium dioxide by the chloride process useable for pigments and other purposes. In such process, gaseous titanium tetrachloride is reacted or combusted with oxygen in a burner reactor unit or zone to produce titanium dioxide. As part of such oxidation reaction, rutile promoting chemicals and particle control additives are commonly introduced into the reactor unit. Rutile promotion chemicals as defined hereafter, and particle control additives, as also defined, are added to provide improved properties to the titanium dioxide end-product.

DESCRIPTION OF THE PRIOR ART

The production of titanium dioxide by vapor phase oxidation of titanium tetrachloride with oxygen or an oxygen-containing gas has been growing in importance compared with older processes in which titaniferous raw materials such as ores and/or slag are digested with mineral acids, preferably sulfuric acid. Among the reasons for this growing acceptance is that, in the vapor phase chloride oxidation, only solid or gaseous reaction products are generated. Thus, no dilute waste acid is created, requiring additional process steps and higher operating costs for re-concentration and treatment. Furthermore, the chloride process is more efficient, and produces, in the view of many customers of titanium dioxide pigments, better quality titanium dioxide.

During the oxidation of titanium tetrachloride, the temperatures in the oxidation reactor can range between 1000° and 2000° C., the variation in temperature being essentially dependent upon whether air, oxygen or a mixture of both is used as the oxidation agent, and upon whether or not additional energy is introduced during oxidation, for instance in the form of a booster flame, usually toluene, or by preheating the oxygen or air utilized. U.S. Pat. No. 5,196,181 assigned to Kronos Inc., the assignee hereof, discloses an invention of the same inventor herein, and describes at length the construction and operation of a burner reaction chamber or zone (an "oxidation reactor") used in the manufacture of titanium dioxide by the chloride process. The stream of hot reaction products (often retorted to as the "reaction mixture") exiting from this oxidation reactor contains nearly pure titanium dioxide in a very finely-distributed form, suspended in gaseous constituents.

Titanium dioxide pigment is widely used in industry as an opacifying pigment in paints and paper coatings, and as a pigmentary agent for a wide variety of fibers and textiles. To create or enhance specially desired pigmentary properties for particular end uses, the pigment is conventionally coated or mixed with other substances, and subjected to a wide variety of treatments.

It is well-known that the crystalline structure of titanium dioxide can vary. A preferred crystalline structure, particularly for obtaining enhanced optical properties which most efficiently refract and reflect light so that the most desirable opacifying properties are obtained, has been designated "rutile".

Chemicals that promote the formation of rutile titanium dioxide crystals have been introduced into the titanium dioxide manufacturing process in the past. For example, if an aluminum compound, notably an aluminum salt such as $AlCl_3$, (aluminum trichloride), is added to the titanium tetrachloride stream, the titanium dioxide product so produced is found to have an increased rutile content, typically in excess of 90 percent, in most cases above 99 percent. See U.S. Pat. Nos. 2,559,638 and 3,214,284. The addition of such an aluminum compound to the reaction zone typically causes no loss in the titanium dioxide pigment's other beneficial properties. This same result is reported to occur when zirconium salt, particularly zirconium tetrachloride, is similarly added to the reaction. DuPont United Kingdom Patent No. 2037266A includes both silicon and phosphorous chlorides among the compounds useful for this purpose.

The amounts of such compounds added to the reaction may vary within a great range, although it is advisable to employ from about 0.5 to about 10 percent on a molar basis of the titanium tetrachloride reacted. This gives a corresponding molar concentration of the aluminum or other compound in the final pigment.

U.S. Pat. No. 3,640,745 describes a process for the production of pigmentary titanium dioxide, where certain additives are introduced to the reaction zone to improve the titanium dioxide produced, so that a more acceptable commercial pigment is obtained. Metallic aluminum or an aluminum compound, notably an aluminum salt, such as aluminum trichloride, is added to the reaction zone, by means of the titanium tetrachloride reactant stream or one or more other suitable gaseous streams entering the reactor. The titanium dioxide product so produced was found to have an increased rutile content. The amount of rutile-promoting salts added to the reaction zone varied within a wide range, although typically they are described as employed in an amount sufficient to provide between about 0.1 and about 10 weight percent, preferably between about 1 and about 5.0 weight percent, and more preferably from about 1.5 to about 2.0 weight percent of co-reacted alumina, calculated as $Al_2O_3$, based on the amount of titanium dioxide produced.

German Patent No. 2032545, published in July, 1980 (and which has no English language counterpart), refers to zinc chloride as well as aluminum trichloride and zirconium tetrachloride as being useful for related rutile promotion purposes, and shows ways of preparing such compounds. Both German Patent No. 2032545 and U.S. Pat. No. 3,542, 521, obtained by a predecessor to the assignee herein, shows a method of making aluminum trichloride for use as a rutile promoter in a titanium dioxide manufacturing process. Finely dispersed aluminum, suspended in nitrogen, is blown in and reacted with excess chlorine; the aluminum trichloride thus formed by a highly exothermic reaction is then discharged from the chamber together with the unconverted chlorine and nitrogen, and introduced into the combustion space of the titanium tetrachloride oxidation reactor. A further 1989 German Patent of assignee's predecessor, German Patent No. 3731199 (which was not filed in the United States) shows that the aluminum trichloride, in powder form, can effectively be pretreated to improve its flow properties. The aluminum powder used is treated with an alkali metal oleate in order to reduce the cold-sintering tendency of the aluminum powder.

In addition to rutile promotion additives, the art has long introduced into the burner reaction zone in the production of titanium dioxide particle size, particle size distribution and quality control compounds, collectively referred to hereafter as control additives. Such control additives are also used to prevent pigment agglomeration, to stabilize the titanium dioxide particles, and to prevent sintering. DuPont German Patent No. 1,262,985 (which has no United States counterpart), published in 1968, discloses that the presence of alkali metal ions and alkaline earth metal ions during the oxidation of titanium tetrachloride has an influence on the grain size and quality of the titanium dioxide pigments and affects the "carbon-black undertone", which is an important pigment property. The patent describes that such ions, in a quantity of from to 1 percent by weight, relative to the titanium dioxide, added during the conversion of the titanium tetrachloride in the oxygen burner unit, improve pigment properties. According to said German Patent No. 1,262,985, since alkali metal ions are sprayed as an aqueous solution into the oxidation reactor, a chlorine loss results due to the formation of hydrogen chloride, and the reaction becomes extremely prone to disturbances because of the formation of crusts in the region of the nozzle bore. It is also disclosed therein that pigments of the rutile type are particularly preferred if aluminum trichloride is simultaneously present in such a quantity that the titanium dioxide formed has an $Al_2O_3$ content of from 0.5 to 2 percent by weight. DuPont U.S. Pat. No. 3,208,866 describes how varying concentrations of controlling salts (including potassium chloride) in a water solution are sprayed into the hot air stream just ahead of the titanium dioxide reaction zone.

Previously discussed U.S. Pat. No. 3,640,745 describes control additives that are ionizable at the temperature at which the oxidation reaction occurs. The alkaline metals and water-soluble inorganic compounds or water-insoluble organic compounds thereof are described as introduced into the burner reaction zone. Particularly disclosed are compounds of sodium, potassium, lithium, rubidium and cesium, with potassium compounds described as providing particularly beneficial results. Typical potassium compounds include inorganic potassium salts such as potassium chloride, potassium bromide, potassium iodide, potassium fluoride, potassium sulfate, potassium nitrate, potassium phosphate, potassium carbonate, and potassium silicate; potassium oxide and potassium hydroxide; organic potassium salts such as potassium benzoate, potassium acetate and phenyl potassium; and mixtures thereof. Similar compounds of lithium, sodium, rubidium and cesium are also described as useful. The alkali metals used can be introduced into the reaction chamber by means of one or more of the entering gas streams or through a separate inlet port. The alkali metals or compounds thereof can be added to the reaction zone in the form of a vapor, a liquid, or a solid.

U.S. Pat. No. 5,204,083 describes introducing metal ion-containing compounds into a vapor-phase titanium dioxide reactor in at least two separate and discrete increments, with the second increment introduced into the reactor after at least 20 percent by weight of the total titanium dioxide has been made. The improvement is described as particularly useful in preparing titanium dioxide having carbon black undertone. The metal ion-containing compounds employed as described in U.S. Pat. No. 5,204,083 are those wherein the metal is one selected from the group consisting of Groups IA, IIA and the Lanthanide Series of metals of the Periodic Table of Elements—such metals are lithium, sodium, potassium, calcium, barium, cesium, and the like. Compounds containing these metals are disclosed as those that are readily ionizable at the high temperatures present in the oxidation reactor. Such compounds include the halides, nitrates, sulfates, carbonates, phosphates, hydroxides, benzoates, alcoholates, and the like, of the aforementioned metals. Of these compounds, the various halides (i.e., the chloride, bromide, iodide and fluoride) of the metal potassium (preferably potassium chloride) are described as the most useful, with the salt from being most preferred. Various mixtures of the above metal-containing compounds also can be employed, according to the patent's specification. The metal ion-containing compounds are disclosed as added to the oxidation reactor in any form; either as a vapor, liquid or solid. The additives are described as preferably being added by introducing the metal ion-containing compound in solid form by pneumatically conveying the solid into the oxidation reactor, using an inert gas such as nitrogen.

SUMMARY OF THE INVENTION

Mixing of the particle control additive in a metal salt from with the metal used to make the rutile promoter (usually aluminum powder in commercial operation), and combined introduction of the two different materials into the ruffle promoter generator reactor (usually an aluminum trichloride generator), was not considered feasible or possible in the prior art, because a precisely-controlled addition of the salt was not possible, owing to the strong tendency of the powders to segregate. Impregnating the aluminum powder with a metal salt solution, with subsequent drying and grinding, would cause considerable additional costs and creates safety concerns (termation of hydrogen); in addition, independent control of each of the two components was not possible with this type of mixture.

The invention herein introduces the metal used to make the rutile promoter and the particle control additive via two separately-controllable addition branches (a main branch and a subsidiary branch) into the rutile promoter generator reactor unit, supplying the predominant quantity of the metal used to make the rutile promotion agent via the main branch, and supplying the metal salt control additive, enveloped in the metal used to make the rutile promotion additive, in powder form via the subsidiary branch.

BRIEF DESCRIPTION OF THE DRAWING

The drawing, without intending to limit the scope of the invention, illustrates diagrammatically one representative process according to the invention, and is explained more fully below.

DETAILED DESCRIPTION OF THE INVENTION

Figure 1:
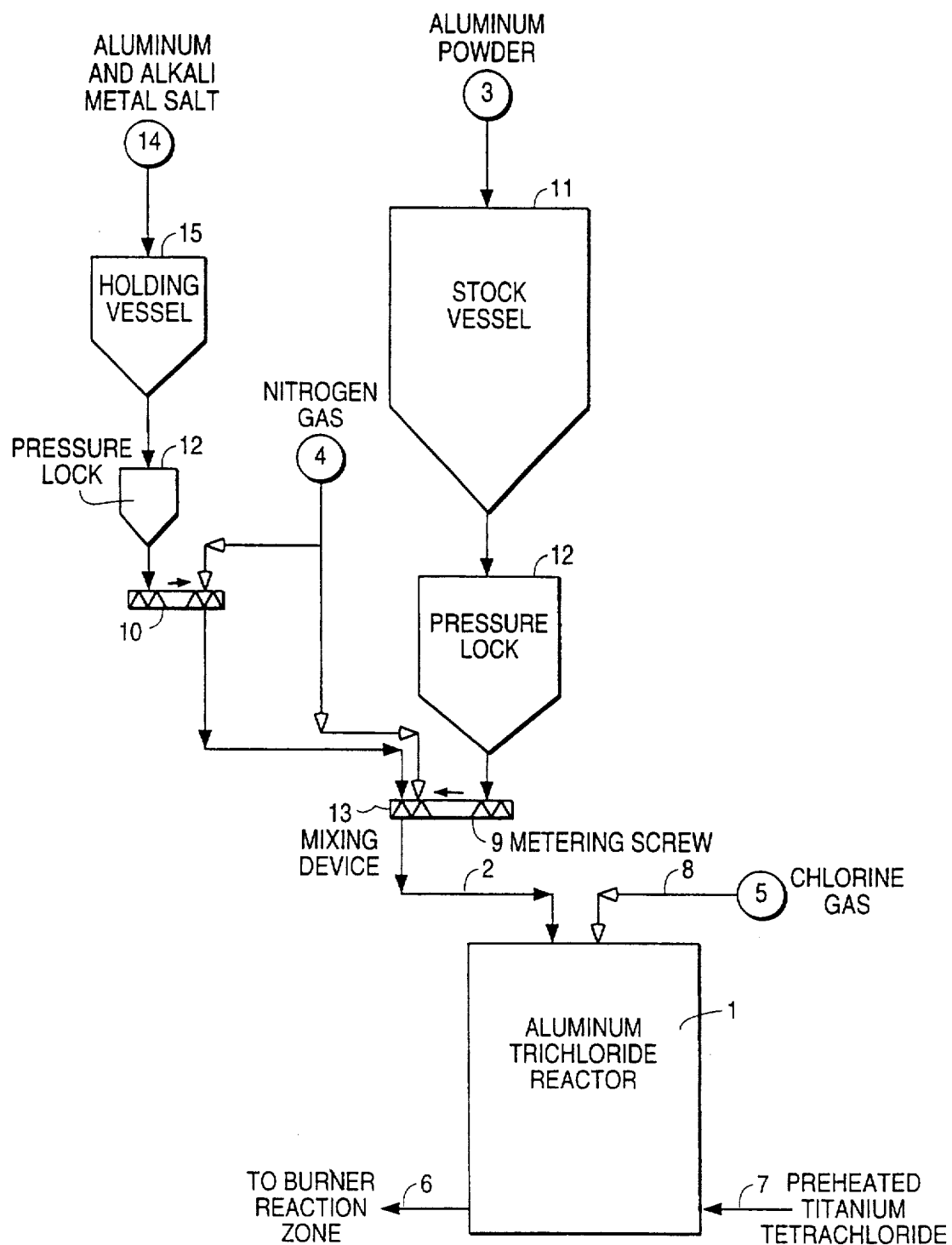

This invention discloses a process wherein small quantities of an alkali metal salt control additive along with the addition of a futile promotion additive, preferably aluminum trichloride, as rutile promoter, is added in the oxidation of titanium tetrachloride into the titanium dioxide burner reactor zone. The metal used to make the rutile promotion agent is introduced by main branch into the rutile promoter generator reactor and the alkali metal salt is introduced by subsidiary branch into the generator reactor, in a controlled addition provided by a "dilution" of the salt in a powder made from, typically, aluminum, and preferably by applying additional agents which improve the free-flowing properties, such as, for example, anhydrous potassium oleate. The mixture is then reacted with chlorine gas, and introduced into the titanium dioxide burner reaction zone.

In the claimed process, the reliable, controllable addition of relatively small quantities of a flee-flowing control additive is particularly advantageous. Any control additive shown in the prior art can be utilized. Any rutile promotion additive useful in the prior art can also be used with aluminum trichloride particularly preferred.

The distribution of the control additive (usually an alkali metal salt) in a relatively large quantity of metal, usually aluminum powder, has the consequence that the control additive crystals are "diluted" by the aluminum particles of similar size to such an extent that an otherwise unpreventable "sticking together" of the additive crystals is avoided. This dilution of the additive in the powder also has the consequence of increasing the aggregate quantity of material being handled, making the addition thereof more easily controllable.

Addition via a feed screw is preferred because of the good controllability; there is hardly any disturbance of the reaction, even over long periods, whereas the spraying of control additive solutions into a chamber in which temperatures above 1000° C. prevail, as in the prior art, leads to salt deposition on the oxidation reactor walls with resulting decreases in operational efficiency. The addition of control additive according to the invention, without concomitant introduction of fluids into the burner, avoids deterioration of the optical properties of the pigment.

The volumes of the metal used to make the rutile promotion additive (for example aluminum trichloride) in the stream supplied in the main branch and subsidiary branch can differ in practice by a factor of 20 or more. A change in throughput in the subsidiary branch can significantly change the quantity of control additive, without significantly affecting the proportion of aluminum in the pigment.

Although other metal compounds are useful, it has been found particularly advantageous to employ potassium chloride salt as the control additive and to treat such salt and the aluminum starting material in the subsidiary branch with a substance which prevents cold-welding and at the same time improves the free-flowing properties. For this purpose, potassium oleate is particularly preferred, especially anhydrous potassium oleate. A quantity of from 0.005 to 0.2 percent by weight of potassium oleate, relative to the quantity of solids in the subsidiary branch, is most preferred.

An explanation of the drawing provides an illustrative understanding of the new invention. The ruffle promotion additive is aluminum trichloride (acting as a representative rutile promoter additive in the manufacture of titanium dioxide) which is generated in a aluminum trichloride generating reactor 1. In the main branch, aluminum powder 3 in a finely dispersed form, suspended in nitrogen 4, is blown via the line 2 into the reactor 1, and chlorine gas 5 is blown via the line 8 into the reactor 1, with aluminum trichloride thereby formed in a highly exothermic reaction. A mixture of aluminum trichloride, chlorine and nitrogen is then fed via the line 6 to the titanium tetrachloride-oxygen burner reaction zone, which is not shown. As a process variant, it is indicated that titanium tetrachloride, preheated to about 350° C., can also be fed via the line 7 to the aluminum trichloride generating reactor 1 and discharged via the line 6, whereby, on the one hand, a further preheating of the titanium tetrachloride by about 100° C. is achieved, which is advantageous in energy terms, and on the other hand, cooling of the aluminum trichloride reactor 1 can also be effected. Pure chlorine gas 5 fed via line 8 is used in an excess, in order to ensure complete conversion of the aluminum into aluminum trichloride.

The gases used should preferably be free of oxygen, in order to avoid formation of metal oxides in the reactor 1, which could entail deposits and, under some circumstances, blockages.

During the reaction of titanium tetrachloride with oxygen, there is a positive pressure of 2 to 3 bar in the burner reaction zone: the aluminum chloride reactor 1 in conjunction with the controlled addition devices 9, 10 must therefore be designed accordingly. In this example, the aluminum powder 3 from a stock vessel 11 is brought via a pressure lock 12 and a metering screw 9 in a mixing device 13 by means of nitrogen 4 into a free-flowing state and pneumatically conveyed to the aluminum trichloride reactor 1.

Separate and apart from the main branch for the controlled addition of aluminum, there is, according to the invention, a second subsidiary branch, through which a mixture 14, consisting of aluminum powder of a typical grain size distribution:

| | |
|---|---|
| 0.2–0.25 mm | 3% |
| 0.063–0.2 mm | 77% |
| d < 0.063 mm | 20% | and an alkali metal salt of similar grain size distribution, is admixed with the main branch at the mixing device 13 and is then introduced into the aluminum trichloride reactor.

In the holding vessel 15, potassium chloride is used as a representative control additive, which is maintained in a free-flowing state and can thus also be added under control in the sense that the metal salt crystals are surrounded by a sufficient quantity of aluminum powder of similar grain size. A ratio of 10 percent by weight of salt to 90 percent by weight of aluminum powder is suitable, although other ratios are also possible.

For a further improvement in the capacity for controlled addition, agents are added to the aluminum powder/salt mixture which, distributed on the surface of the grains, prevent cold-welding of the aluminum powder in the controlled-addition device 10. Potassium oleate in its anhydrous form is particularly suitable for this purpose. The addition of potassium oleate amounts to 0.005–0.2 percent by weight, preferably 0.007 percent by weight, relative to the aluminum powder/salt mixture. The mixture is prepared batchwise in solids mixers, preferably blade mixers.

For good free-flowing properties of the mixture, the mixing process is preferably carried out in two steps. In the first step, initially about 5% of the quantity of aluminum powder required for the mixture is mixed with the total quantity of potassium oleate in a small intensive blade mixer. This mixture is then mixed in a second larger mixer with the alkali metal salt and the remaining quantity of aluminum powder at a temperature of from 25° to 35° C. The mixture prepared in this way shows excellent free-flowing properties and shows no cold-welding tendency even under high pressure forces.

In a typical example, about 13.2 kg of $Al_2O_3$, corresponding to 7 kg of aluminum, per ton of titanium oxide are incorporated in the pigment, resulting in a delivery capacity of about 35 kg/hour for the controlled-addition element 9. By contrast, the quantity delivered in the subsidiary branch amounts to only about 200 to 800 g/hour. It can be seen that an increase or decrease in the quantity of potassium salt by, for example, 10%, causes a fluctuation in the quantity of aluminum in the main branch of only 0.05%. It is preferred that the amount of metal in the main branch be greater by a factor of at least 4 times compared to the quantity of the mixture delivered in the subsidiary branch.

It is not important for the process according to the present invention whether titanium tetrachloride, aluminum trichloride, chlorine and nitrogen and alkali metal ions are fed to the titanium dioxide reaction zone or whether aluminum trichloride and alkali metal ions as additives and the titanium tetrachloride are separately fed to the titanium dioxide reaction zone. It is also possible to add at additional locations, in the titanium dioxide burner reaction zone during processing using the instant invention, additional rutile promotion additives or control additives or both.

Importantly the service life of the reactor is not shortened by this type of addition and—what is also surprising in the case of this procedure—the oxidation in the titanium dioxide burner is in no way adversely affected. The pigment quality is improved in the desired manner, without having other disadvantages. Owing to the avoidance of water in the addition of salt, there is also no additional loss of chlorine.

While the above invention is described in what are the present known preferred embodiments, it should be understood that modifications can be made thereto without departing from the full scope of the invention as defined in the claims that follow.

What is claimed:

1. A process for the manufacture of titanium dioxide by oxidation of titanium tetrachloride in a burner reaction zone into which aluminum trichloride and one or more particle size control additives are added comprising:
    a) providing a predominant quantity of aluminum powder,
    b) preparing a mixture of a subsidary quantity of aluminum powder and one or more particle size control additives,
    c) introducing via separate controllable addition branches into an aluminum trichloride generating reactor the predominant quantity of aluminum powder via one addition branch and the aluminum powder-control additive mixture via a second addition branch to react the aluminum powder with chlorine gas to form aluminum trichloride intermixed with the one or more control additives; and
    d) introducing the product of step c) into the burner reaction zone for oxidation of titanium tetrachloride to form titanium dioxide.

2. The process of claim 1 wherein the addition branches join together prior to entering the aluminum trichloride generating reactor.

3. The process of claim 1 wherein the amount of the aluminum powder in the second branch is less than 25 percent by weight of the aluminum powder in the first branch.

4. The process of claim 1 wherein at least one control additive is a alkali metal salt.

5. The process of claim 4 wherein the alkali metal salt is a potassium salt.

6. The process of claim 5 wherein the potassium salt is potassium chloride.

7. The process of claim 1 wherein the aluminum powder-control additive mixture has been treated with one or more flow control additives.

8. The process of claim 7 wherein potassium oleate is the flow control additive.

9. The process of claim 8 wherein the potassium oleate is anhydrous potassium oleate.

10. The process of claim 1 comprising the additional step wherein one or more control additives are introduced into the burner reaction 2 one at a place other than that where the product of step c) enters.

11. A process for the manufacture of titardum dioxide by oxidation of heated titanium tetrachloride in a burner reaction zone into which during such oxidation aluminum trichloride and one or more control additives are added comprising:
    a) introducing into an aluminum trichloride generating reactor a predominant quantity of aluminum powder via a main addition branch and a subsidiary quantity of aluminum powder in mixture with one or more control additives via a second addition branch,
    b) reacting the aluminum powder with chlorine gas in an exothermic reaction in the aluminum chloride generating reactor to form aluminum trichloride intermixed with the one or more control additives,
    c) heating the titanium tetrachloride with the heat generated by the exothermic reaction; and
    d) introducing the aluminum trichloride intermixed with the one or more control additives into the burner reaction zone for oxidation of titanium tetrachloride to form titanium dioxide.

12. The process of claim 11 where the temperature of the titanium tetrachloride is raised by 50° C. or more.

13. The process of claim 11 wherein the aluminum trichloride and the one or more control additives are introduced into the burner reaction zone with the heated titanium tetrachloride.

* * * * *